US012443934B1

(12) United States Patent
Schwarz, Jr. et al.

(10) Patent No.: US 12,443,934 B1
(45) Date of Patent: Oct. 14, 2025

(54) PROPERTY EVENT TRACKING SYSTEMS AND METHODS

(71) Applicant: United Services Automobile Association (USAA), San Antonio, TX (US)

(72) Inventors: Thomas Wayne Schwarz, Jr., Helotes, TX (US); Snehal Desai, Richardson, TX (US); Nolan Serrao, Plano, TX (US); Jeanie Graciela Lopez, San Antonio, TX (US); Jennifer Hunt Erickson, San Antonio, TX (US); Bharat Prasad, San Antonio, TX (US); Yevgeniy Viatcheslavovich Khmelev, San Antonio, TX (US); Joel S. Hartshorn, Olalla, WA (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/797,541

(22) Filed: Feb. 21, 2020

Related U.S. Application Data

(60) Provisional application No. 62/809,125, filed on Feb. 22, 2019.

(51) Int. Cl.
*G06F 15/173* (2006.01)
*G06F 15/16* (2006.01)
(Continued)

(52) U.S. Cl.
CPC .......... *G06Q 20/102* (2013.01); *G16Y 10/80* (2020.01); *G16Y 20/10* (2020.01); *G16Y 40/10* (2020.01); *G16Y 40/40* (2020.01); *H04L 9/0637* (2013.01)

(58) Field of Classification Search
CPC ........ G16Y 40/10; G16Y 40/40; G16Y 20/10; G16Y 10/80; G16Y 40/50; G06Q 20/102; G06Q 20/101; H04L 9/0637; H04L 63/10; H04L 63/102; G08B 13/196; G08B 13/19608; G08B 13/19613; G07C 9/00563
(Continued)

(56) References Cited

U.S. PATENT DOCUMENTS 7,185,078 B2 * 2/2007 Pleyer ................. H04L 41/0233
                                                            709/223
10,825,318 B1 * 11/2020 Williams ............... G16H 50/20
(Continued)

*Primary Examiner* — Bharat Barot
(74) *Attorney, Agent, or Firm* — Fletcher Yoder P.C.

(57) ABSTRACT

Systems and methods described herein facilitate the tracking of events relating to property. For example, in certain embodiments, a system includes a property event detection device (e.g., smart home device, sensor device, and so forth) configured to detect activity (e.g., motion, light, sound, and so forth) proximate the property. The system also includes a property event tracking system configured to receive data (e.g., images, videos, facial recognition, movement recognition, object tracking, sound signatures, wireless data streams, and so forth) relating to the activity from the property event detection device, to determine whether the activity relates to a property event (e.g., home service, and so forth) for the property, and to store data relating to the property event in a distributed ledger (e.g., blockchain network) upon determination that the activity relates to the property event for the property.

18 Claims, 5 Drawing Sheets

(51) Int. Cl.
    *G06Q 20/10*     (2012.01)
    *G16Y 10/80*     (2020.01)
    *G16Y 20/10*     (2020.01)
    *G16Y 40/10*     (2020.01)
    *G16Y 40/40*     (2020.01)
    *H04L 9/06*     (2006.01)

(58) Field of Classification Search
    USPC ................................ 709/223–224, 202–203
    See application file for complete search history.

(56) References Cited

U.S. PATENT DOCUMENTS

| | | | |
|---|---|---|---|
| 11,003,334 B1* | 5/2021 | Conway | G06Q 40/08 |
| 11,050,763 B1* | 6/2021 | Lyle | H04L 9/3263 |
| 2010/0295656 A1* | 11/2010 | Herickhoff | H04L 63/08 |
| | | | 340/3.1 |
| 2015/0127712 A1* | 5/2015 | Fadell | H04L 12/2807 |
| | | | 709/202 |
| 2017/0173262 A1* | 6/2017 | Veltz | G16H 20/17 |
| 2019/0180277 A1* | 6/2019 | Vienravee | G06Q 20/405 |
| 2019/0251520 A1* | 8/2019 | Bentley, III | G06Q 10/20 |
| 2019/0304228 A1* | 10/2019 | Trundle | G06Q 10/0833 |
| 2019/0318329 A1* | 10/2019 | Castinado | G06Q 20/102 |
| 2019/0354875 A1* | 11/2019 | Madden | G06N 20/00 |
| 2019/0394106 A1* | 12/2019 | Correnti | H04L 63/10 |
| 2020/0014552 A1* | 1/2020 | Tan | H04L 12/2825 |

\* cited by examiner

PROPERTY EVENT TRACKING SYSTEMS AND METHODS

CROSS-REFERENCE TO RELATED APPLICATION

The present disclosure is related to, and claims priority to, U.S. Provisional Patent Application Ser. No. 62/809,125, titled "Property Event Tracking Systems and Methods," which was filed on Feb. 22, 2019, and which is herein incorporated by reference in its entirety for all purposes.

BACKGROUND

The present disclosure relates generally to tracking events that occur proximate certain types of property, such as real property. More specifically, the present disclosure relates to tracking events that occur proximate certain types of property using distributed ledger techniques.

As smart devices continue to become more advanced, smart homes may be able to monitor activities that occur in their vicinity with increasing efficiency. However, smart devices are often only configured to monitor events directly related to their own functionality. For example, a smart appliance may only be configured to perform functions that directly impact that particular appliance's functionality. Such smart devices are rarely used to complement the functionalities of other smart devices.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

BRIEF DESCRIPTION

Figure 1:
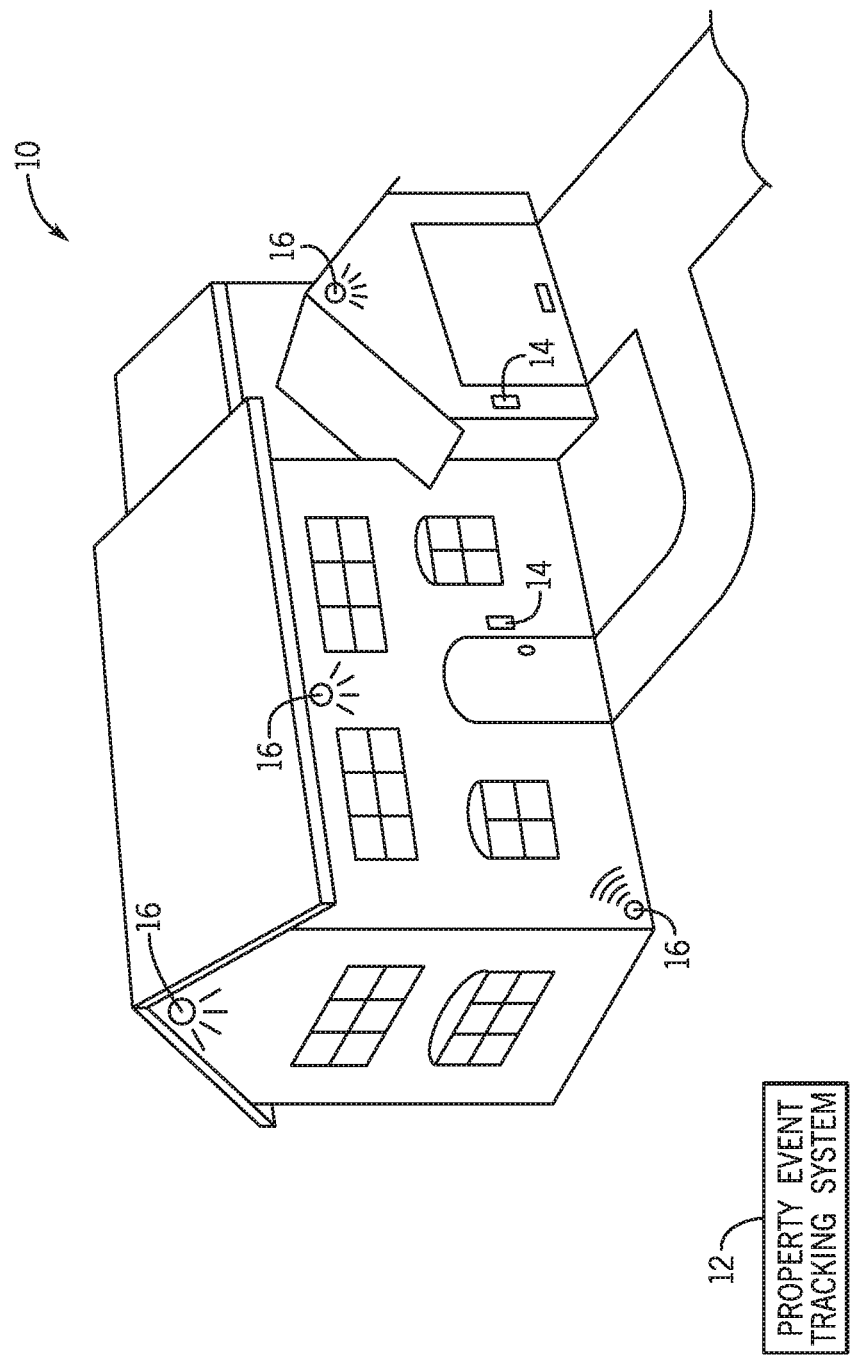
FIG. 1 illustrates a piece of property that may be monitored by a property event tracking system, in accordance with embodiments described herein.

In an embodiment, a system includes a property event detection device configured to detect activity proximate a property. The system also includes a property event tracking system configured to receive data relating to the activity from the property event detection device, to determine whether the activity relates to a property event for the property, and to store data relating to the property event in a distributed blockchain network upon determination that the activity relates to the property event for the property.

In another embodiment, a method includes receiving, via a property event tracking system, data relating to detected activity proximate a property from a property event detection device. The method also includes determining, via the property event tracking system, whether the detected activity relates to a property event for the property. The method further includes storing, via the property event tracking system, data relating to the property event in a distributed blockchain network upon determination that the detected activity relates to the property event for the property.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The embodiments described herein facilitate the tracking of property events relating to property, such as real property. For example, in certain embodiments, a system includes a property event detection device (e.g., smart home device, sensor device, and so forth) configured to detect activity (e.g., motion, light, sound, and so forth) proximate the property. The system also includes a property event tracking system configured to receive data (e.g., images, videos, facial recognition, movement recognition, object tracking, sound signatures, wireless data streams, and so forth) relating to the activity from the property event detection device, to determine whether the activity relates to a particular property event (e.g., home service, and so forth) for the property, and to store data relating to the particular property event in a distributed ledger (e.g., blockchain network) upon determination that the activity relates to the particular property event for the property.

FIG. 1 illustrates a piece of property (e.g., a house) 10 that may be monitored by a property event tracking system 12, in accordance with embodiments described herein. Specifically, as described in greater detail herein, the property event tracking system 12 may be configured to monitor for the occurrence of various events relating to the property 10. For example, the property event tracking system 12 may be configured to determine (e.g., detect) whether, and when, certain home services (e.g., house cleaning, lawn maintenance, pool cleaning, and so forth) have been completed for the property 10. In certain embodiments, upon determination (e.g., detection) of completion of the home services, the property event tracking system 12 may authorize payment for the services using, for example, a distributed ledger (e.g., blockchain) that stores data relating to performance of and payment for the home services, as described in greater detail herein. In certain embodiments, disputes relating to performance of the home services, payment for the home services, and so forth, may also be tracked by the property event tracking system 12 (e.g., using data stored in a distributed ledger, such as a blockchain). In certain embodiments, such disputes may lead to refusal and/or reversal of payment, reduction in reputation scores, and so forth. Furthermore, in certain embodiments, completion of certain home services may trigger other events, such as scheduling of other home services, and so forth.

In certain embodiments, the property event tracking system 12 includes one or more smart home devices 14 and/or one or more sensor devices 16, which may be disposed in or around the property 10, and which may be used to detect certain activity (e.g., motion, light, sound, and so forth) in or around the property 10, wherein certain data (e.g., images, videos, facial recognition, movement recognition, object tracking, sound signatures, wireless data streams, and so forth) relating to such activity may be used to determine when certain events have occurred relating to the property 10. As such, the smart home devices 14 and the sensor devices 16 may be referred to as property event detection devices. For example, the one or more smart home devices 14 may include, but are not limited to:

smart appliances, such as washers, dryers, refrigerators, ovens, dishwashers, and so forth;
home entertainment systems, such as televisions, audio systems, game consoles, media players, and so forth;
in-home control systems, such as garage door openers, door bells, alarm systems, security systems (e.g., security lights, security cameras, locks, and so forth), safety systems (e.g., smoke detectors, carbon monoxide detectors, and so forth), and other smart home systems (e.g., windows, chimney flues, and so forth);
lighting devices, such as lamps, fixtures, and so forth;
utility systems that provide and/or control electric power, natural gas, water, sewage, heating, ventilation, and air conditioning (HVAC), network access, and so forth, such as HVAC units, thermostats, vents, water meters, water heaters, gas meters, electrical switch boxes, circuit breaker boxes, and so forth; and
portable or less portable computing devices, such as smartphones, tablet computers, electronic book readers, laptop computers, desktop computers, television set-top boxes, in-vehicle automotive computers or telematics devices, and so forth.

In addition, the one or more sensor devices 16 may include, but are not limited to cameras, motion detection devices, acoustic sensors, wireless signal receivers, and so forth. As described in greater detail herein, the one or more smart home devices 14 and/or the one or more sensor devices 16 may be configured to monitor the property 10 for various types of data (e.g., images, videos, facial recognition, movement recognition, object tracking, sound signatures, wireless data streams, and so forth) that may be used by the property event tracking system 12 to determine that certain events have occurred relating to the property 10. For example, in certain embodiments, the one or more smart home devices 14 and/or the one or more sensor devices 16 may capture images and/or video of certain people that have come into close proximity with the property 10 (e.g., within 200 feet of, within 150 feet of, within 100 feet of, within 50 feet of, within 25 feet of, within 20 feet of, within 15 feet of, within 10 feet of, within 5 feet of, within 3 feet, or even closer to, the property 10) and, using these images and/or video, the people may be recognized (e.g., using facial recognition) and their movement may be tracked relative to the property 10. Furthermore, in certain embodiments, sound signatures that occur during the person's proximity to the property 10 may help determine events that were performed during the person's proximity to the property 10. In addition, in certain embodiments, wireless data streams emanating from electronic devices associated with the person may help provide information relating to an identity of the person. For example, certain electronic devices may be "leaky", providing wireless data that may, in certain circumstances, be used to identify the person.

The property event tracking system 12 described herein is specifically configured to determine that certain events relating to the property 10 have occurred based at least in part on these types of activity data, and to take certain actions based on the determined property events. Specifically, in certain embodiments, the images, video, sounds, wireless data, and other types of data described herein may be analyzed by the property event tracking system 12 to determine certain patterns of the respective types of data, which correlate to particular types of events. For example, physical movements of a home repair technician may be observed by the property event tracking system 12 from video that is captured by the one or more smart home devices 14 and/or the one or more sensor devices 16 proximate the property 10, and these observed physical movements may be compared to patterns of physical movements stored in a memory of the property event tracking system 12 for the purpose of determining when certain events, such as a particular home repair, has occurred.

Figure 2:
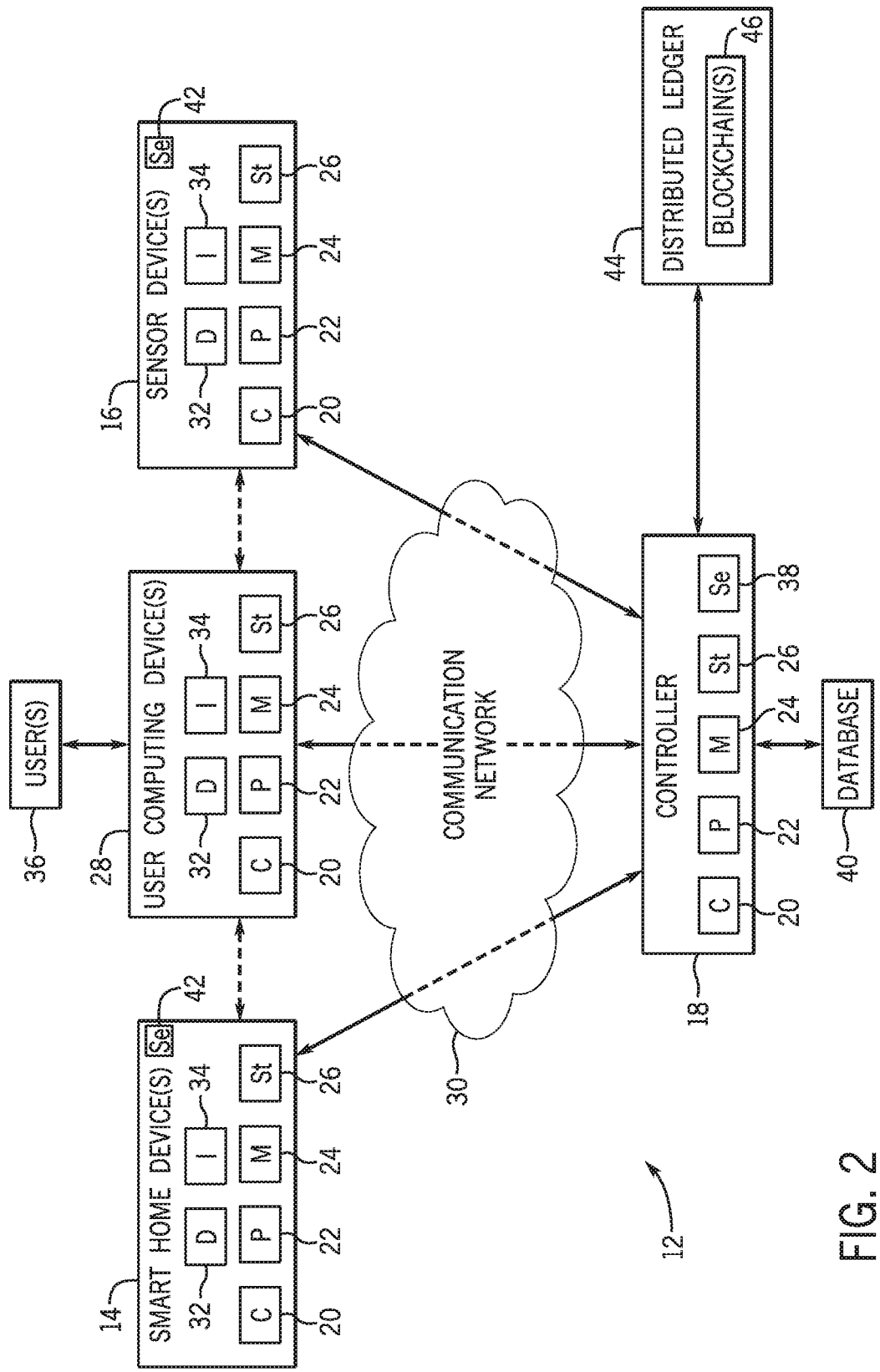
FIG. 2 is a block diagram of the property event tracking system, in accordance with embodiments described herein.

FIG. 2 is a block diagram of the property event tracking system 12, in accordance with embodiments described herein. In certain embodiments, the property event tracking system 12 may include a central controller 18 (e.g., a smart hub) configured, among other things, to determine when certain events relating to the property 10 have occurred, and to take certain actions based at least in part on the determined property events, as described in greater detail herein. As illustrated, in certain embodiments, the central controller 18 may include at least one communication component 20, at least one processor 22, at least one memory 24, and at least one storage device 26, as well as other processing circuitry that enable the central controller 18 to determine when certain events relating to the property 10 have occurred, and to take certain actions based at least in part on the determined property events, as described in greater detail herein.

In certain embodiments, the communication component(s) 20 of the central controller 18 may include wireless and/or wired communication components that may facilitate communication with the one or more smart home devices 14, the one or more sensor devices 16, and/or one or more user computing devices 28 (e.g., that may be associated with the property 10), as well as other devices, via a wireless and/or wired local communication network 30. In certain embodiments, the user computing device(s) 28 may include any computing devices such as smartphones, tablet computing devices, laptop computing devices, desktop computing devices, wearable computing devices, and so forth. In certain embodiments, the central controller 18 may communicate with the one or more smart home devices 14, the one or more sensor devices 16, the one or more user computing devices 28, and/or other devices or systems of the property event tracking system 12 via Wi-Fi, near field communication, Bluetooth, Zigbee, radio frequency identification (RFID) tags and/or readers, an embedded wireless module, and/or another suitable wired or wireless local communication network 30.

As used herein, the term "local communication network" is intended to mean a local area communication network to which the central controller 18, the one or more smart home devices 14, the one or more sensor devices 16, the one or more user computing devices 28, and/or other devices or systems of the property event tracking system 12 are either directly communicatively coupled to each other (e.g., via wired communication cables, and so forth) or are wirelessly communicatively coupled to each other within a relatively limited wireless range (e.g., which generally covers only an environment around the property 10). For example, in certain embodiments, the relatively limited wireless range provided by the local communication network 30 may be a wireless range of less than 300 feet, less than 250 feet, less than 200 feet, less than 150 feet, less than 100 feet, less than 50 feet, or even less).

In certain embodiments, the processor(s) 22 of the central controller 18 may be any suitable type of computer processors or microprocessors capable of executing computer-executable code. In certain embodiments, the memory 24 and the storage device 26 of the central controller 18 may be any suitable articles of manufacture that can serve as media to store processor-executable code, data, or the like. These articles of manufacture may represent computer-readable media (e.g., any suitable form of memory or storage) that may store the processor-executable code executed by the processor(s) 22 to perform the presently disclosed techniques. In certain embodiments, the memory 24 and the storage device 26 of the central controller 18 may also be used to store data, various other software applications, and the like. In certain embodiments, the memory 24 and the storage device 26 of the central controller 18 may represent non-transitory computer-readable media (e.g., any suitable form of memory or storage) that may store the processor-executable code used by the processor(s) 22 to perform various techniques described herein. It should be noted that non-transitory merely indicates that the media is tangible and not a signal. It should be noted that the components described herein with regard to the central controller 18 are exemplary components, and that the central controller 18 may include additional or fewer components in certain embodiments.

Additionally, it should be noted that the smart home device(s) 14, the sensor device(s) 16, and the user computing device(s) 28 may also include similar components as described as part of the central controller 18 (e.g., respective communication component(s) 20, processor(s) 22, memory 24, storage device 26, and so forth). In addition, in certain embodiments, one or more of the smart home device(s) 14, the sensor device(s) 16, and the user computing device(s) 28 described herein may also include a display 32 and at least one input 34, which may facilitate a user 36 interacting with the respective smart home device 14, sensor device 16, or user computing device 28. For example, in certain embodiments, a user 36 of a user computing device 28 may manipulate the input(s) 34 of a user computing device 28 to cause settings (e.g., relating to operating parameters) of one or more of the smart home devices 14 and/or sensor devices 16 associated with the property 10 to be adjusted (e.g., controlled), and the communication component(s) 20 of the user computing device 28 may either directly communicate control signals to the smart home devices 14 and/or sensor devices 16 being controlled via the local communication network 30, or may communicate the control signals to the central controller 18, which may then use its own communication component(s) 20 to transmit the control signals to the smart home devices 14 and/or sensor devices 16 being controlled via the local communication network 30.

As such, in certain embodiments, the user computing device 28 (or the user computing device 28 and the central controller 18 operating in conjunction, in certain embodiments) may enable users 36 to adjust settings of one or more smart home devices 14 and/or one or more sensor devices 16 in and around the property 10, for example, for the purpose of detecting events that occur related to the property 10, as described herein. For example, in certain embodiments, a user 36 may interact with control indicators displayed on the display 32 of the user computing device 28 to adjust a setting of a smart home device 14 and/or sensor device 16. In addition, in certain embodiments, a user 36 may interact with other control indicators, such as the inputs 34 of the user computing device 28 (e.g., by pressing a button, sliding an adjustable indicator, using voice commands, using gestures, and/or other suitable techniques) to adjust a setting of a smart home device 14 and/or sensor device 16. In any event, in certain embodiments, a user 36 may view (e.g., via the display 32 of the user computing device 28) which smart home devices 14 and/or sensor devices 16 may be controlled within an environment, and may control a smart home device 14 and/or sensor device 16 using the control indicators. It will also be appreciated that the display(s) 32 and/or input(s) 34 on the smart home device(s) 14 and/or the sensor device(s) 16 may enable direct adjustment of settings of the respective device. In certain embodiments, the settings of the smart home device(s) 14 and/or the sensor device(s) 16 that may be adjusted include, but are not limited to, whether the particular device is turned on or off, whether the particular device is activated (e.g., to currently detect events relating to the property 10), particular types of events for which the device should be actively detecting data, and so forth.

As such, in certain embodiments, the central controller 18 may be configured to communicatively couple to the various smart home devices 14 and/or sensor devices 16 associated with the property 10. In addition, in certain embodiments, the central controller 18 may include sensors 38 (e.g., cameras, position sensors, and so forth) that enable the central controller 18 to detect the various smart home devices 14 and/or sensor devices 16 capable of being controlled in and around the property 10. In certain embodiments, once the central controller 18 establishes communication with a respective smart home device 14 and/or sensor device 16, the central controller 18 may communicate with a local database 40 (e.g., located within the particular environment, such as the property 10 illustrated in FIG. 1) via the local communication network 30 to collect information related to the respective smart home device 14 and/or sensor device 16. In certain embodiments, the local database 40 provides information related to the smart home devices 14 and/or the sensor devices 16, such as available adjustable settings, ranges of values for the available adjustable settings, color options, images to be displayed, predetermined positions of the smart home devices 14 and/or the sensor devices 16, and/or other information that enables the central controller 18 to generate control indicators that may be presented to the user 36, which enables the user 36 to adjust settings of the smart home devices 14 and/or the sensor devices 16.

Accordingly, in certain embodiments, at least some of the smart home devices 14 and/or sensor devices 16 associated with a particular property 10 may have settings adjusted by users 36. In other words, at least some of the smart home devices 14 and/or sensor devices 16 associated with a particular property 10 may be specifically configured by one or more users 36 to have settings that facilitate sensors 42 of the respective smart home device 14 and/or sensor device 16 to detect data that may be used by the central controller 18 to determine that certain events associated with the property 10 have occurred. However, in other embodiments, at least some of the smart home devices 14 and/or sensor devices 16 associated with a particular property 10 may have settings automatically (e.g., without intervention from any human users 36) adjusted (e.g., by the central controller 18) based at least in part, for example, on the data received from the smart home devices 14 and/or sensor devices 16. For example, if certain data collected by the sensors 42 of the smart home devices 14 and/or sensor devices 16 indicates that certain property events may have been initiated, the central controller 18 may transmit control signals to the smart home devices 14 and/or sensor devices 16 to adjust operation of the sensors 42 (e.g., adjusting a direction of view of a camera-based sensor 42, adjusting a direction of an acoustic-based sensor 42 toward a particular sound of interest, and so forth), and the smart home devices 14 and/or sensor devices 16 may automatically (e.g., without intervention from any human users 36) adjust (e.g., by the central controller 18) the operational parameters accordingly.

As described in greater detail herein, in certain embodiments, the central controller 18 may store data relating to various property events that are detected by the sensors 42 of the smart home devices 14 and/or sensor devices 16 in a distributed ledger 44, such as one or more blockchains 46. Use of a distributed ledger 44 (e.g., blockchain system) provides for property event tracking that is relatively fast, inexpensive, ubiquitous, secure, and immutable. As described in greater detail herein, in certain embodiments, smart contracts may be configured to perform operations to manage the tracking of property events relating to various properties 10.

As described in greater detail herein, one or more smart home devices 14 and/or one or more sensor devices 16 (i.e., property event detection devices) may be used to detect activity proximate the property 10. For example, the detected activity may include, among other things, motion, light, sound, and so forth, which are detected in or around the property 10, and which occur within the property 10, on the property 10, or around the property 10 within a finite distance (e.g., within 200 feet, within 150 feet, within 100 feet, within 50 feet, within 25 feet, within 20 feet, within 15 feet, within 10 feet, within 5 feet, within 3 feet, or even closer) from an outer boundary of the property 10. Indeed, in certain embodiments, the proximity of the detected activity may only be limited by the detection ranges of the sensors 42 of the smart home devices 14 and/or the sensor devices 16.

As also described in greater detail herein, in certain embodiments, the property event tracking system 12 may be configured to receive data (e.g., images, videos, facial recognition, movement recognition, object tracking, sound signatures, wireless data streams, and so forth) relating to the detected activity from the smart home devices 14 and/or the sensor devices 16, to determine whether the detected activity relates to a property event for the property 10, and to store data relating to the property event in the distributed ledger 44 upon determination that the detected activity relates to the property event for the property 10. In certain embodiments, the property event may include a home service (e.g., house cleaning, lawn maintenance, pool cleaning, and so forth) that has been, or is currently being, performed for the property 10. In addition, in certain embodiments, the property event tracking system 12 may be configured to authorize payment for the home service via the distributed ledger 44 (e.g., upon detection of completion of the home service). In addition, in certain embodiments, the property event tracking system 12 may be configured to facilitate resolution of a dispute relating to the home service including, but not limited to, disputes relating to performance of the home service, payment for the home service, and so forth.

In addition, in certain embodiments, the property event tracking system 12 may be configured to trigger another property event upon determination that the detected activity relates to a particular property event for the property 10. For example, performance of a first home service may enable (and, indeed, trigger) a request for performance of a second home service. For example, upon a determination that the first home service has been completed (e.g., based on detection by one or more smart home devices 14 and/or one or more sensor devices 16), the property event tracking system 12 may send a request to a user computing device 28 of a user 36 that the second home service is desired. In addition, in certain embodiments, the property event tracking system 12 may be configured to send a control signal to activate a security system (e.g., which may be, or include, one of the smart home devices 14 associated with the property 10) based at least in part on the detected activity to, for example, activate an alarm or other notification (e.g., via a smart home device 14, a sensor device 16, a user computing device 28, or other device).

Moreover, in certain embodiments, the property event tracking system 12 may be configured to identify a person based at least in part on the detected activity. For example, in certain embodiments, the property event tracking system 12 may be configured to identify the person based on facial recognition, movement recognition, object tracking (e.g., of a license plate on a car), and so forth. In addition, in certain embodiments, the property event tracking system 12 may be configured to detect "leaky" data from an application running on a user computing device 28 of the person, which may help the property event tracking system 12 identify the person. Furthermore, in certain embodiments, the property event tracking system 12 may be configured to alert a law enforcement agency (e.g., via the communication component(s) 20 of the central controller 18) of both the detected activity as well as an identity of the person.

In addition, in contrast to situations where the identified person is deemed to be a bad actor by the property event tracking system 12, the property event tracking system 12 may instead identify the person as a person who has specific authorization to access certain areas of the property 10. In such situations, the property event tracking system 12 may send control signals to one or more smart home devices 14 to automatically (e.g., without intervention from any human users 36) actuate certain features (e.g., unlock door locks, unlock gate locks, and so forth) of the property 10 to facilitate access for the person.

Figure 3:
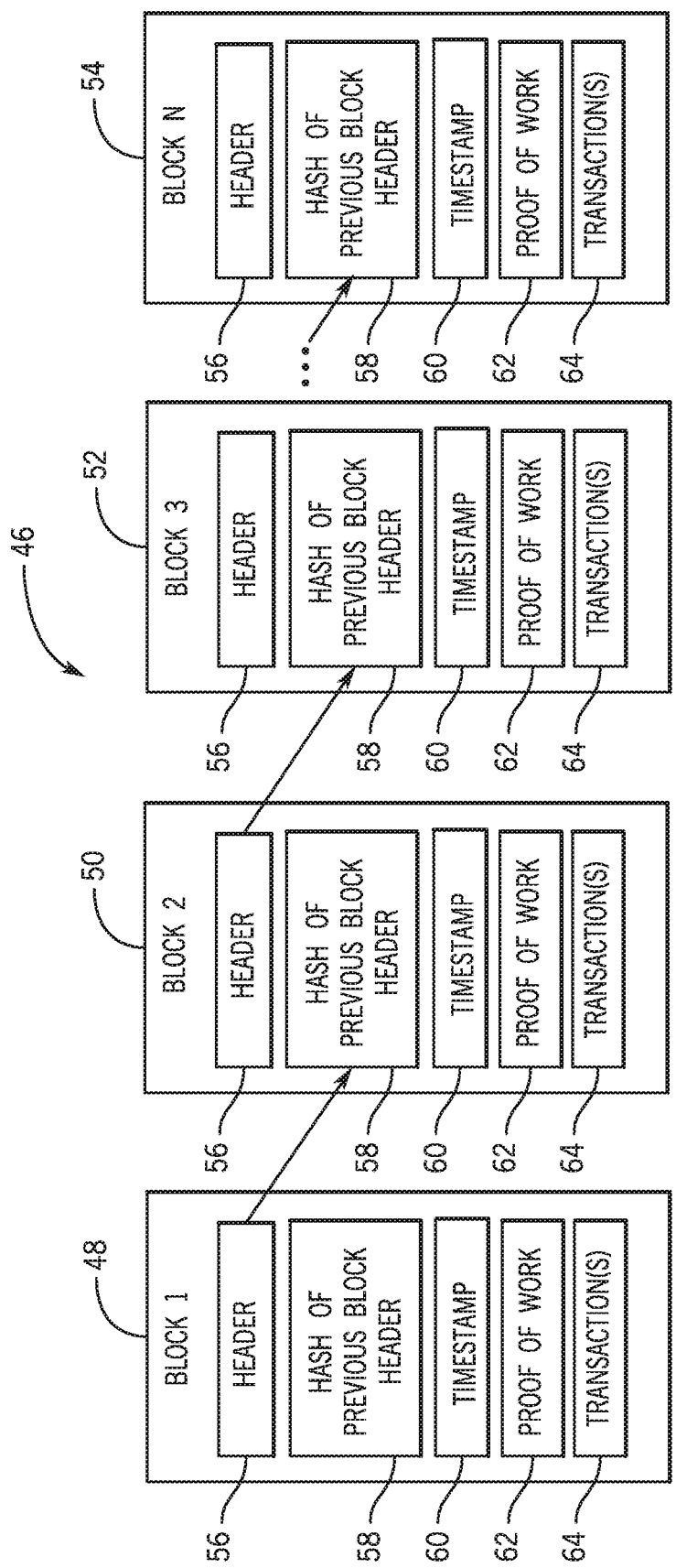
FIG. 3 is a block diagram of a blockchain of a distributed ledger of FIG. 2, in accordance with embodiments described herein.

To provide context for the embodiments described herein, FIG. 3 is a block diagram of the blockchain 46 of the distributed ledger 44 of FIG. 2, in accordance with embodiments described herein. In the illustrated embodiment, the blockchain 46 is illustrated as having multiple blocks 48, 50, 52, and 54. The block 48 (first block in the blockchain 46) may have been created, for example, by the central controller 18, and allocated as a special starting block. The block 48 may include a unique header 56 uniquely identifying the block 48 from other blocks in the blockchain 46. Because the block 48 is the first block in the blockchain 46, a hash of a previous block header 58 may be set to zero. A timestamp 60 may include the date of creation for the block 48, and a proof of work section 62 may include certain "work" that proves that a "miner" has performed work suitable for the creation of the block 48 and/or to verify transactions in the blockchain 46. The work section 62 may vary based on a protocol used to create the blockchain 46. For example, a bitcoin protocol may use a Merkle tree. The Merkle tree may be a tree data structure in which every leaf node is labelled with a hash (e.g., one-way hash) of a data block, and every non-leaf node is labelled with a cryptographic hash of the labels of its child nodes. Because of the one-way transformation used in hashing, the Merkle tree has the property that there is no known technique that a deceptive party could use to guess a value that would hash with a second-to-last value to create the Merkle root, which is know from a verified blockchain 46, and so on, down the tree. In other words, there is no way to create a fake value that would hash to an expected Merkle tree value (e.g., value stored in work section 62 of the block 48), thus creating a single value that proves the integrity of all of the transactions under it.

Transactions, such as recording of property events, authorization relating to payment for property events, and so on, as described in greater detail herein, may be stored in a transactions section 64. In certain embodiments, a new block may be created when a new property event is detected. When a new block is created, the block will receive a new header 56 uniquely identifying the new block. As described in greater detail herein, a peer-to-peer network may include multiple "miners" that add blocks to the blockchain 46 based on the blockchain protocol. In general, multiple miners validate transactions 64 that are to be added to a block, and compete (e.g., perform computing work, as introduced above) to have their respective block added to the blockchain 46. In certain embodiments, validation of transactions includes verifying digital signatures associated with respective transactions 64. For a block to be added to the blockchain 46, a miner must demonstrate a proof of work before their proposed block of transactions is accepted by the peer-to-peer network, and before the block is added to the blockchain 46.

In certain embodiments, a blockchain protocol may include a proof of work scheme (e.g., Merkle Tree) that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In certain embodiments, the hash value is a one-way hash value such that the output hash value cannot be "unhashed" to determine what the input was. In certain embodiments, the blockchain protocol may require multiple pieces of information as input to the CHF. For example, the input to the CHF may include a reference to the previous (most recent) block (e.g., hash 58) in the blockchain 46, details of the transaction(s) 64 that are to be included in the to-be-created block, and a "nonce" value (e.g., a random number used only once).

Multiple nodes may compete to hash a set of transactions, and to provide the next block that is to be added to the blockchain 46. In certain embodiments, the blockchain protocol may provide a threshold hash to qualify a block to be added to the blockchain 46. For example, the threshold hash may include a predefined number of zeros ($0s$) that the hash value must have at the beginning (e.g., at least the first four characters of the hash value must each be zero). The higher the number of zeros, the more computationally time-consuming it may be to arrive at a qualifying hash value.

In accordance with the blockchain protocol, each miner in the peer-to-peer network receives transaction information for one or more transactions that are to be included in a block that is to be added next in the blockchain 46. Each miner provides the reference to the previous (most recent) block in the blockchain 46, details of the transaction(s) 64 that are to be included in the to-be-created block, and the nonce value to the CIF that may then be used to provide a hash value. If the hash value does not meet the threshold hash (e.g., the first four characters of the hash value are not each zero), the miner starts again to provide another hash value, thus increasing the amount of work. Alternatively, if the hash value meets the threshold hash (e.g., at least the first four characters of the hash value are each zero), the respective miner may have successfully created the next block that is to be added to the blockchain 46. Consequently, the respective miner's block is broadcast across the peer-to-peer network (e.g., all user devices 118 communicatively coupled to the system 100). At this point, all other miners cease work (because one miner was already successful), and all copies of the blockchain 46 are updated across the peer-to-peer network to append the block to the blockchain 46. Each miner may produce hundreds of thousands (or more) of hash values, before any one miner provides a qualifying hash value (e.g., at least the first four characters of the hash value are each zero).

It is to be noted that any computing device may be a miner. Because of the distributed nature of the peer-to-peer network created via the distributed ledger 44, each node (e.g., computing device) may include copies of the blockchain 46 and share copies of the blockchain 46 as new peers enter the peer-to-peer network. Each copy of the blockchain 46 may include verified information for all or substantially all of the property events tracked by the distributed ledger 44. The information is secure, immutable, and more efficiently tracked as new property events get added via the distributed ledger 44.

Figure 4:
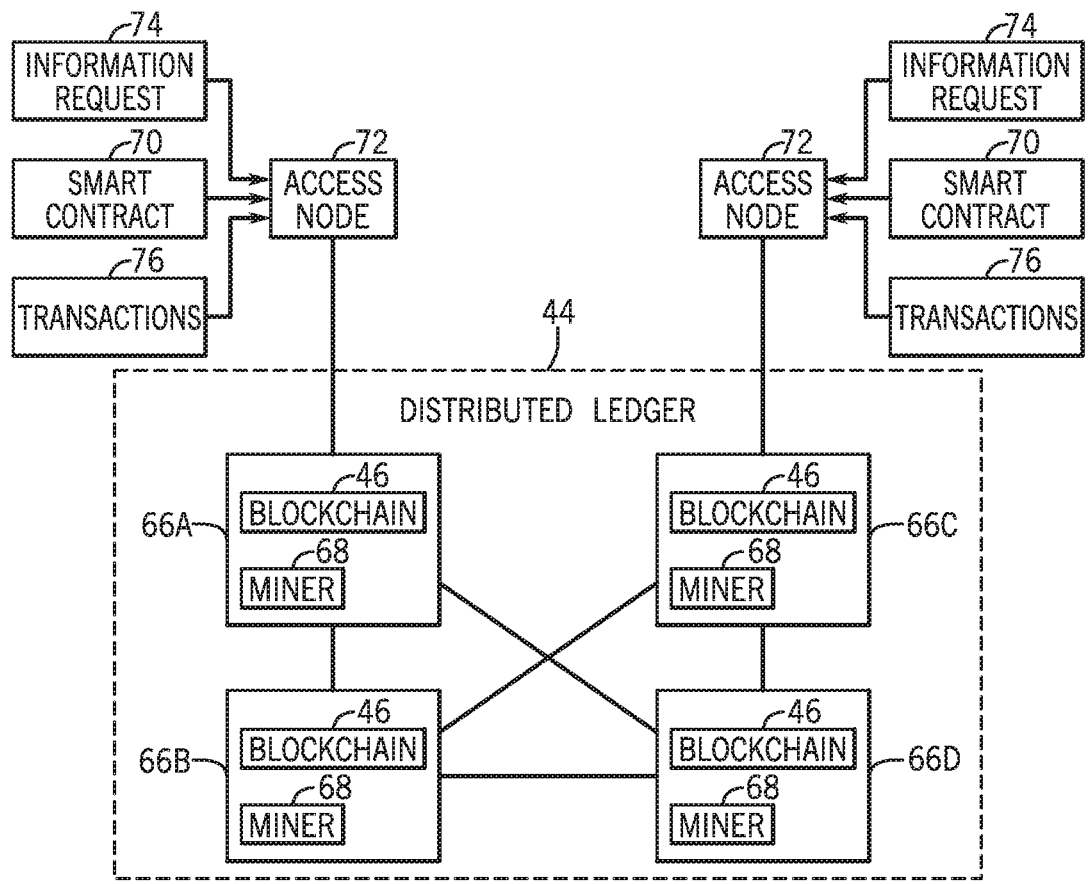
FIG. 4 is a block diagram of interaction with the distributed ledger of FIG. 2, which may be used to track property events, in accordance with embodiments described herein.

FIG. 4 is a block diagram of interaction with the distributed ledger 44 of FIG. 2, which may be used to track property events, in accordance with embodiments described herein. As described herein, the distributed ledger 44 may be formed by several blockchain nodes, such as blockchain nodes 66A, 66B, 66C, and 66D, which may be implemented by a dedicated server or computer device, or may be implemented as a virtual machine in a shared computer system. Each blockchain node 66A-D may have in its memory a replicate of the blockchain 46. Each blockchain node 66A-D may also have a miner 68, an application that may verify the integrity of the blockchain 46, and may also perform operations and/or transactions using smart contracts 70 associated with the blockchain 46. As described herein, the blockchain 46 is a replicated data structure that may have its consistency and integrity preserved by a consensus mechanism performed by the miners 68.

Users 36 may interact with the distributed ledger 44 via an access node 72 (e.g., using a user computing device 28). For example, users 36 may request, through the access node 72, the recordation and/or processing of data (e.g., using a smart contract 70), such as an information request 74 (e.g., a request for the state of a smart contract 70), or a transaction request 76 (e.g., a request for a change in a state of the smart contract 70) to the blockchain 46. The smart contracts 70, information requests 74, and/or transaction requests 76 allow users 36 to record history information relating to property events, and to obtain information related to the property events, as described herein. Each access node 72 may be implemented by a computing device (e.g., a user computing device 28) coupled to the distributed ledger 44.

A miner 68 from any of the blockchain nodes 66A, 66B, 66C, and 66D may create an update to the blockchain 46. In certain embodiments, the smart contract 70 may be a data structure that may include states and transaction instructions relating to the data stored in the blockchain 46. The transactions, or functions, may include instructions that modify the states of the smart contracts 70 and/or interact with other smart contracts 70 by performing further transactions. Examples of smart contracts 70 described herein include smart contracts 70 related to storing historical information relating to property events, as described herein. Following insertion of the smart contract 70, the blockchain node 66 may propagate its update of the blockchain 46, and the other blockchain nodes 66 may accept the update using a consensus mechanism (e.g., proof of work, proof of stake, and so forth). For example, if blockchain node 66A generated a blockchain segment that incorporates some smart contract 70 to the blockchain 46, blockchain node 66A may propagate the updated blockchain 46 to blockchain nodes 66B, 66C, and 66D, which may validate and accept the updated blockchain 46.

Similarly, a transaction request 76 may be received by any miner 68 of the blockchain nodes 66A, 66B, 66C, and 66D via an access node 72. The transaction request 76 may perform operations that cause a change in the state of a smart contract 70 recorded in the blockchain 46. After performing the desired operations, and changing the state of the smart contract 70, in accordance with the transaction request 76, the miner 68 may update the blockchain 46 to record the updated state of the smart contract 70. The updated state of the smart contract 70 may be propagated to the blockchain nodes 66A-D, verified, and persisted using consensus mechanisms. An information request 74, similar to a transaction request 76, may be received by a miner 68, and may perform operations associated with a smart contract 70. However, in contrast with the transaction request 76, the information request 74 does not lead to changes in the state of the smart contract 70 and, thus, updates to the blockchain 46 that result from a successful information request 74 are not performed.

In certain embodiments, performance of the operations by the miners 68 of the blockchain nodes 66 may be incentivized and/or regulated by exchange of tokens (e.g., currencies) of the blockchain 46. For example, in public blockchains, updates to the blockchain 46 by a blockchain node 66A-D may be rewarded with a blockchain token. Moreover, performance of a transaction request 76 or an information request 74 may be rewarded with a blockchain token. For example, in certain embodiments, in the Ethereum public blockchain, updates to the blockchain from recordation of smart contracts 70 and information requests 74 may be rewarded with Ether tokens, and performance of transaction requests 76 and information requests 74 may be incentivized by offers of Ethers in the form of a secondary token called "gas". In certain private blockchain embodiments, tokens may be used to implement prioritization mechanisms for the operations and/or to prevent large or faulty operations from blocking the blockchain 46 with arbitrarily long operation times.

Figure 5:
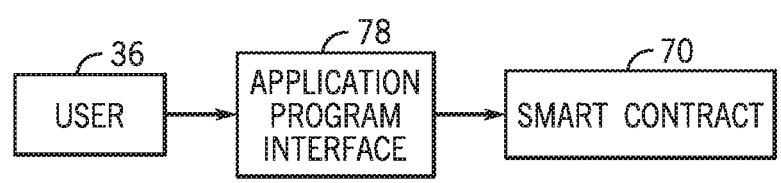
FIG. 5 illustrates an application program interface that may be used to interact with one or more smart contracts, in accordance with embodiments described herein.

The infrastructure described herein may be accessed by an application program interface (API) 78, illustrated in diagram 80 of FIG. 5. In certain embodiments, the API 78 may be accessed (e.g., by a user computing device 28) from an access node 72. The API 78 may provide users 36 with an interface to the distributed ledger 44. It should be noted that the user 36 may be a human operator accessing a user interface provided by the API 78 or another software performing calls to a computer-accessible interface (e.g., a library) of the API 78. In certain embodiments, the API 78 may be loaded as an interface in an access node 72, or a resource available on the internet that may be accessed using a network application (e.g., a browser) in the access node 72. In certain embodiments, the API 78 may provide tools for creation and interaction with smart contracts 70. For example, the API 78 may convert the state and the functions of a smart contract 70 to binary code for storage and execution by miners 68 of the blockchain 46. In certain embodiments, the API 78 may also convert (e.g., compile) transactions 76 or information requests 74 to a binary message that may be transmitted to the blockchain 46 for execution by miners 68. In certain embodiments, the users 36 may access the smart contracts 70 using the APIs 78, which obey interaction protocols established by the smart contracts 70. Customization of the APIs 78 may allow integration between the various devices of the property event tracking system 12.

In certain embodiments, the API 78 may include the option for signing smart contract transactions 76. The signature of the smart contract transaction 76 may include encryption methods using a public/private key infrastructure. For example, a user 36 may have a private key to sign the smart contract transaction 76, which provides proof that the contract was originated by the user 36. Moreover, public/private key infrastructure may also be used to encrypt transactions 76 and prevent unauthorized access. For example, a user 36 may encrypt a transaction parameter using a public key of the smart contract 70 to produce a transaction 76 that can only be readily understood by the smart contract 70. To interact with a smart contract 70, a user 36 may specify a type of smart contract 70, and the API 78 may provide a list of member functions of that particular smart contract 70. The user 36 may, then, choose the member function, and provide inputs or parameters associated with the transaction 76. It should be noted that certain transactions 76 and information requests 74 may require a digital signature for authorization, in certain embodiments. Digital signatures may use the same above-discussed public/private key.

To perform transactions 76, the API 78 may provide an option for the amount of "gas" that a user 36 is willing to use to incentivize performance of the transaction 76, as discussed above. The API 78 may request performance of the transaction 76 to the blockchain 46. The API 78 may receive from the blockchain 46 the results of the transaction 76, which may include an output of the transaction 76, an acknowledgment of execution and/or an indication of failure, when the transaction 76 causes an error, or if the amount of "gas" was insufficient to finalize the operation. It should be understood that the API 78 may provide an interactive user interface that may be accessed by a human user or an executable library that may be accessed by a computing device (e.g., a user computing device 28). The executable library facilitates access to the property event tracking system 12 by other applications in the user computation environment.

Figure 6:
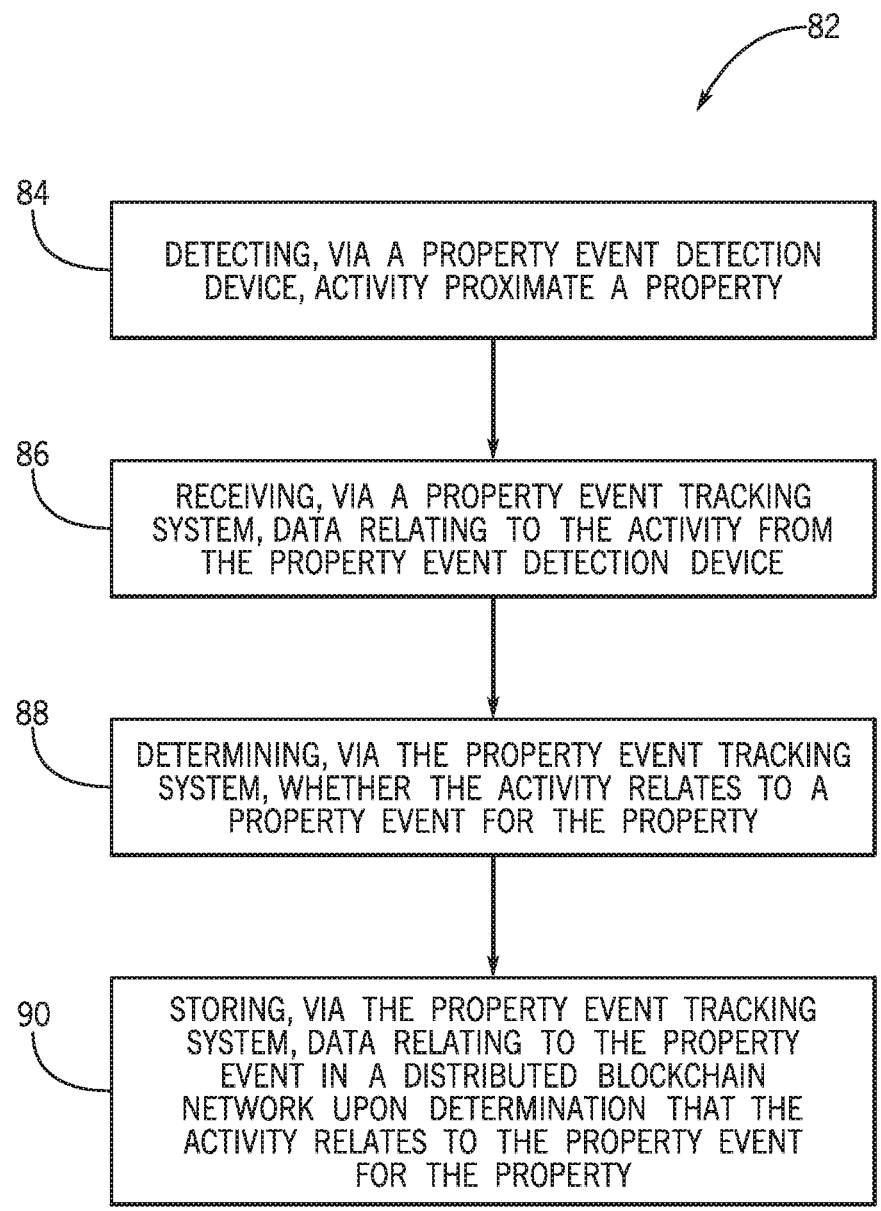
FIG. 6 is a flow diagram of a method of operating the property event tracking system, in accordance with embodiments described herein.

FIG. 6 is a flow diagram of a method 82 of operating the property event tracking system 12, in accordance with embodiments described herein. For example, in certain embodiments, the method 82 includes detecting, via a property event detection device (e.g., a smart home device 14 or a sensor device 16), activity proximate the property 10 (block 84). In addition, in certain embodiments, the method 82 includes receiving, via the property event tracking system 12, data relating to the activity from the property event detection device (block 86). In addition, in certain embodiments, the method 82 includes determining, via the property event tracking system 12, whether the activity relates to a property event for the property 10 (block 88). In addition, in certain embodiments, the method 82 includes storing, via the property event tracking system, data relating to the property event in the distributed ledger 44 (i.e., the blockchain 46) upon determination that the detected activity relates to the property event for the property 10 (block 90).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
a property event detection device comprising one or more sensors configured to detect activity proximate a property, wherein the detected activity comprises detected patterns of physical movements of a person; and
a property event tracking system configured to receive data relating to the detected activity from the property event detection device, to determine whether the detected patterns of physical movements of the person indicate that a type of home service has been performed by the person for the property by comparing data relating to the detected patterns of physical movements of the person to data relating to service-related patterns of physical movements that are stored in memory of the property event tracking system, and to store data relating to the home service in a distributed blockchain network upon determination that the detected patterns of physical movements of the person indicate that the type of home service has been performed by the person for the property, wherein the service-related patterns of physical movements correlate to particular types of home services.

2. The system of claim 1, wherein the property event detection device comprises a smart home device associated with the property.

3. The system of claim 2, wherein the smart home device comprises a smart appliance, a home entertainment system, an in-home control system, a lighting device, a utility system, or a portable computing device.

4. The system of claim 1, wherein the home service comprises house cleaning, lawn maintenance, pool cleaning, or some combination thereof.

5. The system of claim 1, wherein the property event tracking system is configured to authorize payment for the home service via the distributed blockchain network.

6. The system of claim 1, wherein the property event tracking system is configured to facilitate resolution of a dispute relating to the home service.

7. The system of claim 1, wherein the property event tracking system is configured to trigger a second home service upon determination that the detected patterns of physical movements of the person indicate that the type of home service has been performed by the person for the property.

8. The system of claim 1, wherein the property event tracking system is configured to activate a security system based at least in part on the detected activity.

9. The system of claim 1, wherein the property event tracking system is configured to automatically adjust a direction of detection of a sensor of the one or more sensors of the property event detection device.

10. A method, comprising:
receiving, via a property event tracking system, data relating to detected activity proximate a property from a property event detection device comprising one or more sensors configured to detect the activity, wherein the detected activity comprises detected patterns of physical movements of a person;
determining, via the property event tracking system, whether the detected patterns of physical movements of the person indicate that a type of home service has been performed by the person for the property by comparing data relating to the detected patterns of physical movements of the person to data relating to service-related patterns of physical movements that are stored in memory of the property event tracking system; and
storing, via the property event tracking system, data relating to the home service in a distributed blockchain network upon determination that the detected patterns of physical movements of the person indicate that the type of home service has been performed by the person for the property, wherein the service-related patterns of physical movements correlate to particular types of home services.

11. The method of claim 10, wherein the property event detection device comprises a smart home device associated with the property.

12. The method of claim 11, wherein the smart home device comprises a smart appliance, a home entertainment system, an in-home control system, a lighting device, a utility system, or a portable computing device.

13. The method of claim 10, wherein the home service comprises house cleaning, lawn maintenance, pool cleaning, or some combination thereof.

14. The method of claim 10, comprising authorizing, via the property event tracking system, payment for the home service via the distributed blockchain network.

15. The method of claim 10, comprising facilitating, via the property event tracking system, resolution of a dispute relating to the home service.

16. The method of claim 10, comprising triggering, via the property event tracking system, a second home service upon determination that the detected patterns of physical movements of the person indicate that the type of home service has been performed by the person for the property.

17. The method of claim 10, comprising activating, via the property event tracking system, a security system based at least in part on the detected activity.

18. The method of claim 10, comprising automatically adjusting, via the property event tracking system, a direction of detection of a sensor of the one or more sensors of the property event detection device.

\* \* \* \* \*